Patented Oct. 2, 1934

1,975,544

UNITED STATES PATENT OFFICE 1,975,544

PASTE FOR STORAGE BATTERY PLATES

Harold R. Harner and Troy W. Carney, Joplin, Mo., assignors to The Eagle-Picher Lead Company, Cincinnati, Ohio, a corporation of Ohio No Drawing. Application July 30, 1931, Serial No. 554,152

5 Claims. (Cl. 136—26)

Our invention relates to the manufacture of storage battery plates, and has for its object to provide a plate of improved initial capacity in the battery, particularly in high rate and low temperature discharge, and maintenance of this improved capacity.

It is an established fact that certain organic bodies not well defined in their chemical composition and in their origin, and known in the literature for more than a century as humins and ulmins, humic bodies and ulmic bodies, humic acids and ulmic acids, have a high beneficial effect when used in a storage battery plate, as shown by U. S. Patent, numbered 619,622 issued to Alexander Schanschieff, of London, England, February 14, 1899, for Secondary battery, and U. S. Patent numbered 614,339 issued to Federico Pescetto, of Turin, Italy, November 15, 1898, for Electric accumulators.

These organic bodies can be obtained from different sources and can readily be isolated from such materials as soil, peat, coal and other natural substances. They also can be prepared by chemical means, as by treatment of carbohydrates with mineral acids, a phenomenon very well known and understood for more than a century, as disclosed by Dr. S. A. Waksman in his book entitled "Principles of Soil Microbiology", 2nd edition, published by Williams & Wilkins Company, Baltimore, Md., 1932. However, it has been definitely established that all these organic preparations are not chemical entities but their chemical nature depends upon the material from which they are extracted, as well as upon the nature of the chemical reagents used for their extraction, conditions under which extraction takes place, such as temperature, pressure, etc., and also upon the precipitation of these bodies from their solution.

In order to do away with all these uncertainties, and in order to obtain a definite product, we carried out various investigations leading to the formation of a standard product suitable for our purposes. We have discovered a special process for preparing active material for lead acid storage battery plates which includes certain organic bodies, which, when mixed with a lead compound, or mixture of lead compounds, made into a paste, with suitable vehicle, applied to storage battery grids, and treated in suitable ways in process, produce the desired result of improved initial capacity, particularly in high rate and low temperature discharge, and maintenance of this improved capacity.

By our newly discovered process we have so standardized conditions, with the result that we produce, under controlled conditions, special organic bodies which depend upon the activities of micro-organisms. In describing the conditions and the processes which we have adopted, so as to obtain the maximum formation of the organic bodies needed for our purpose, we have utilized the well known principles involved in the decomposition of plant residues by micro-organisms under aerobic conditions. It is well known that plant materials, such as tan bark, straw, sawdust, leaves and other plant residue, in the presence of sufficient moisture, proper aeration, and sufficient available nitrogen, are able to undergo decomposition, whereby certain constituents, such as the celluloses and hemi-celluloses, are rapidly broken down by certain micro-organisms, comprising various fungi and bacteria. In this process, certain complexes, such as the lignins, are found to be very resistant to decomposition, and hence they accumulate, in a condition modified by microbial activity. The micro-organisms which bring about the decomposition of the above mentioned carbohydrates also synthesize large quantities of new complexes such as proteins and fats, as well as certain hemi-celluloses. As a result of these processes of decomposition the compost is considerably reduced in total actual matter, as expressed by dry weight.

When such a compost, after a proper period of decomposition, under controlled conditions, which we have worked out in detail, is extracted with an alkali solution, various chemical complexes are brought into solution. These include some of the modified lignin complexes and some of the newly synthesized bodies, such as proteins and hemi-celluloses. When the alkali solution, containing these bodies, is neutralized by means of an acid and treated with lead oxide, the formation of a heavy precipitate takes place. This precipitate is a lead organic complex, quite stable in nature and fairly well defined chemically. It is this complex which forms the basis of our discovery.

In a preferred embodiment of our invention we make a compost of plant residue, such as tan bark, straw, sawdust or leaves, under controlled conditions. By the term "compost" we mean a material, or a mixture of materials of plant origin, undergoing aerobic decomposition by micro-organisms under optimum conditions and under controlled conditions. To about 3000-parts of this compost with a moisture content of approximately 30% is added caustic soda and water, and the whole brought to a boil, which condition is maintained for 12 hours. This is then allowed to cool during which time the solid particles settle toward the bottom while the clear liquor is run into a separate container. That portion remaining in the tank is again admixed with caustic soda, and water, and boiled for an additional 12 hours, after which it is allowed to cool and settle. The resultant liquor is removed into a tank with the previous batch where it is made ready for use by adding sulphuric acid of approximately 1.835 specific gravity, and the resultant product admixed with a lead compound, or mixture of lead compounds, forming a lead-organic complex.

The amount of the lead-organic complex needed is found to vary with the result desired, and the other lead materials (litharge, red lead, lead suboxide, etc.) used. Good results have been obtained by a mixture of one part lead-organic complex and sixteen parts other lead materials by weight, giving 0.3 parts organic material in the dry blend.

It is to be understood that the details of the method including proportions of materials used, may be varied depending upon the composition of raw materials used, and that various changes may be made, therefore, without departing from the invention or sacrificing any of the advantages thereof.

Having now described our invention, what we claim and desire to secure by Letters Patent, is:

1. A paste for storage battery plates comprising a mixture of a lead compound and a substance resulting from the treatment of a composted tan bark with an alkaline solution which is subsequently neutralized with an acid.

2. A paste for storage battery plates composed of a mixture of a lead compound and a precipitate resulting from the treatment of a compost of tan bark with an alkaline solution and neutralizing the resultant solution with an acid.

3. The method of preparing paste for storage battery plates, comprising treating a composted plant residue with an alkaline solution, boiling the mixture, separating the resultant liquor, neutralizing this liquor by means of an acid, and mixing the resulting precipitate with lead compound.

4. The method of preparing paste for storage battery plates, comprising the steps of treating a compost of tan bark with an alkaline solution, neutralizing the resulting solution and mixing the resulting precipitate with lead compound.

5. The method of forming a paste for use in storage battery plates which consists in treating with an alkaline solution composted plant residue formed of a material of a class consisting of tan bark, sawdust, straw or leaves, and which have undergone decomposition, neutralizing the solution and mixing the resulting precipitate with lead compound.

HAROLD R. HARNER.
TROY W. CARNEY.